(12) United States Patent
Furuyashiki et al.

(10) Patent No.: US 11,787,126 B2
(45) Date of Patent: Oct. 17, 2023

(54) BONDING SYSTEM AND BONDING METHOD

(71) Applicants: Toyota Customizing & Development Co., Ltd., Yokohama (JP); Honda Motor Co., Ltd., Tokyo (JP); Aisin Seiki Kabushiki Kaisha, Kariya (JP); Toyota Jidosha Kabushiki Kaisha, Toyota (JP); National University Corporation Nagoya University, Nagoya (JP); Toray Industries, Inc., Tokyo (JP); Teijin Limited, Osaka (JP); Komatsu Ltd., Tokyo (JP); Subaru Corporation, Tokyo (JP)

(72) Inventors: Kenji Furuyashiki, Tokyo (JP); Hiroshi Yuchi, Tokyo (JP); Satoshi Hirawaki, Wako (JP); Yoshinori Yamamori, Tokyo (JP); Takayuki Mori, Kariya (JP); Yoshihiro Iwano, Toyota (JP); Kazuaki Amaoka, Nagoya (JP)

(73) Assignees: TOYOTA CUSTOMIZING & DEVELOPMENT CO., LTD., Yokohama (JP); AISIN SEIKI KABUSHIKI KAISHA, Kariya (JP); TOYOTA JIDOSHA KABUSHIKI KAISHA, Toyota (JP); NATIONAL UNIVERSITY CORPORATION NAGOYA UNIVERSITY, Nagoya (JP); TORAY INDUSTRIES, INC., Tokyo (JP); TEIJIN LIMITED, Osaka (JP); KOMATSU LTD., Tokyo (JP); SUBARU CORPORATION, Tokyo (JP)

(*) Notice: Subject to any disclaimer, the term of this patent is extended or adjusted under 35 U.S.C. 154(b) by 154 days.

(21) Appl. No.: 16/499,220

(22) PCT Filed: Mar. 23, 2018

(86) PCT No.: PCT/JP2018/011930
§ 371 (c)(1),
(2) Date: Feb. 3, 2021

(87) PCT Pub. No.: WO2018/181073
PCT Pub. Date: Oct. 4, 2018

(65) Prior Publication Data
US 2021/0162681 A1   Jun. 3, 2021

(30) Foreign Application Priority Data
Mar. 29, 2017 (JP) .................................. 2017-065548

(51) Int. Cl.
*B29C 65/02* (2006.01)
*B29C 65/00* (2006.01)
(Continued)

(52) U.S. Cl.
CPC ............ *B29C 66/863* (2013.01); *B29C 65/02* (2013.01); *B29C 65/08* (2013.01); *B29C 65/32* (2013.01);
(Continued)

(58) Field of Classification Search
CPC ................ B29C 66/863; B29C 66/865; B23K 2101/006
See application file for complete search history.

(56) References Cited

U.S. PATENT DOCUMENTS

| | | | | |
|---|---|---|---|---|
| 4,529,115 A | * | 7/1985 | Renshaw | B23K 20/10 228/1.1 |
| 4,749,437 A | * | 6/1988 | Welter | B29C 65/08 228/1.1 |

(Continued)

FOREIGN PATENT DOCUMENTS

| | | |
|---|---|---|
| CN | 105188986 | 12/2015 |
| CN | 106041298 | 10/2016 |

(Continued)

OTHER PUBLICATIONS

Brunnecker et al., "Das schweißt zusammen," Feb. 1, 2011, pp. 56-59, XP055498450.

(Continued)

*Primary Examiner* — Scott W Dodds
(74) *Attorney, Agent, or Firm* — Dority & Manning, P.A.

(57) ABSTRACT

A bonding system includes a supporting jig having a mounting surface on bonding substrates which are mounted, a bonding device that sandwiches and welds the bonding substrates between itself and the mounting surface, an articulated robot to which the bonding device is attached, and a control unit that controls the articulated robot and the bonding device.

14 Claims, 8 Drawing Sheets

(51) Int. Cl.
  *B29C 65/08* (2006.01)
  *B29C 65/32* (2006.01)
  *B29C 65/78* (2006.01)
  *B29L 31/30* (2006.01)

(52) U.S. Cl.
  CPC .... B29C 65/7841 (2013.01); B29C 66/91411 (2013.01); *B29L 2031/30* (2013.01)

(56) References Cited

U.S. PATENT DOCUMENTS

| | | | | |
|---|---|---|---|---|
| 4,865,687 A | * | 9/1989 | Pierson | B29C 65/08 156/73.1 |
| 5,184,439 A | * | 2/1993 | Ward | E04C 2/38 52/223.6 |
| 5,355,578 A | * | 10/1994 | Van Den Berg | H01J 9/236 29/605 |
| 2005/0258152 A1 | | 11/2005 | Kawamoto et al. | |
| 2007/0045385 A1 | * | 3/2007 | Okoshi | B23K 33/006 228/110.1 |
| 2009/0212090 A1 | * | 8/2009 | Hepp | B25J 9/0096 228/47.1 |
| 2018/0250924 A1 | * | 9/2018 | Thomas | B29C 66/61 |

FOREIGN PATENT DOCUMENTS

| | | |
|---|---|---|
| FR | 3020585 | 11/2015 |
| JP | H03-502789 | 6/1991 |
| JP | H03-184830 | 8/1991 |
| JP | H07-227907 | 8/1995 |
| JP | 2005-329436 | 12/2005 |
| JP | 2005329439 | 12/2005 |
| JP | 2007176057 | 7/2007 |
| JP | 2010-105376 | 5/2010 |
| JP | 5687801 | 1/2015 |
| JP | 2015093482 | 5/2015 |
| JP | 2015120335 | 7/2015 |
| JP | 2016-168598 | 9/2016 |
| WO | WO 2011-138568 | 11/2011 |
| WO | WO 2013/153951 | 10/2013 |

OTHER PUBLICATIONS

Extended European Search Report (EESR) for corresponding application No. EP 18 77 6525, dated Nov. 30, 2020, 11 pages.
Chinese First Examination Report, (w/ English translation) for corresponding CN Application No. 2018800219142, dated Apr. 15, 2021, 9 pages.
International Search Report for PCT/JP2018/011930, dated May 22, 2018, 4 pages.
Chinese Second Office Action (with English Translation) for corresponding CN Application No. 201880021914.2, dated Nov. 15, 2021, 12 pages.

* cited by examiner

BONDING SYSTEM AND BONDING METHOD

TECHNICAL FIELD

The present disclosure relates to a bonding system and a bonding method.

BACKGROUND ART

Technologies relating to the bonding of resin materials are disclosed in Japanese Unexamined Patent Application Laid-Open (JP-A) Nos. 2015-093482 and 2015-120335, and in Japanese Patent No. 5687801.

Because the aforementioned technologies provide unidirectional bonding, they enable planar shapes such as test pieces and the like to be bonded together. However, they make no mention of bonding and manufacturing involving resin articles that have 3-dimensional configurations and therefore require multidirectional bonding (for example, large-sized resin parts for automobiles).

In addition, technologies that utilize an adhesive agent to bond together large-sized resin parts for automobiles that have 3-dimensional configurations also exist. However, because of the cost of the adhesive agent and the jig occupation time until curing is completed, such methods cannot be said to increase productivity.

Bonding equipment that may be hypothesized from the known technology includes a C-gun type bonding device 200 (see FIG. 8) that provides two-sided access, however, such equipment would have the following drawbacks.

Figure 8:
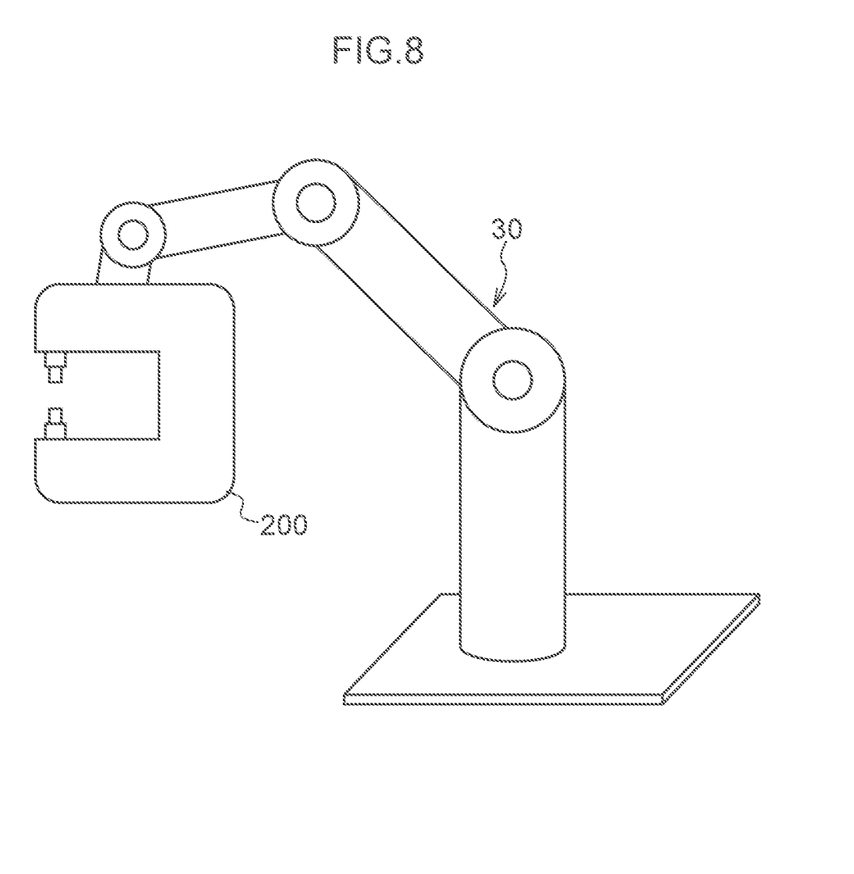
FIG. 8 is a view showing a C-gun type of bonding device of the conventional technology.

In other words, a C-gun type of bonding device provides poor tool accessibility, and it is difficult to bond central portions of articles having a so-called 'deep belly' using such a bonding device. In addition, bonding onto undercut-shaped portions is not possible, so that there are many limitations on the type of shapes that can be bonded. In order to deal with portions such as these, preprocessing is performed such as forming a hole in the parts, and then punching a blind rivet into each fastening point. As a consequence, increases in processing costs and processing time are unavoidable. Moreover, because a C-gun is used, an articulated robot 30 capable of transporting a heavy payload is necessary, so that a sizable amount of capital investment is needed. In addition, it may also be assumed that the speed of transporting will also be slow.

SUMMARY OF THE INVENTION

Technical Problem

The present disclosure was conceived in view of the above-described circumstances and provides a bonding system and a bonding method that provide superior productivity when parts formed from a thermoplastic resin material are bonded together via welding.

Solution to the Problem

A bonding system according to a first aspect of the present disclosure includes a supporting jig having a mounting surface on which bonding substrates are mounted, a bonding device that sandwiches and welds the bonding substrates between the bonding device and the mounting surface, an articulated robot to which the bonding device is attached, and a control unit that controls the articulated robot and the bonding device.

In the bonding system according to the first aspect of the present disclosure, bonding substrates are mounted on a mounting surface of a supporting jig. Moreover, a bonding device that sandwiches the bonding substrates between the bonding device and the mounting surface and that welds the bonding substrates is attached to an articulated robot 30. In addition, the articulated robot and the bonding device are controlled by a control unit. As a result of these components being operated, bonding substrates 90 are bonded. Because of this, the bonding device is able to access the bonding substrates from one side thereof, and perform a bonding operation on the bonding substrates. Accordingly, productivity is improved.

A bonding system according a second aspect of the present disclosure is characterized in that, in the bonding system according to the first aspect, the mounting surface is formed so as to include a plurality of bonding supporting surfaces, and the control unit controls the articulated robot and the bonding device such that the bonding substrates are welded on the plurality of bonding supporting surfaces.

A bonding system according a third aspect of the present disclosure is characterized in that, in the bonding system according to the first aspect, there is further provided a temperature adjustment device that adjusts a temperature of the mounting surface.

A bonding system according a fourth aspect of the present disclosure is characterized in that, in the bonding system according to the first aspect, the mounting surface is formed so as to include a plurality of bonding supporting surfaces, and there is further provided a temperature adjustment device that adjusts a temperature of the plurality of bonding supporting surfaces.

A bonding system according a fifth aspect of the present disclosure is characterized in that, in the bonding system according to any one of the first though fourth aspects, there is further provided an operating device that operates the supporting jig.

A bonding method according a sixth aspect of the present disclosure is a bonding method in which bonding substrates, which include a thermoplastic resin material, are bonded using a bonding system provided with a supporting jig having a mounting surface on which bonding substrates are mounted, a bonding device that sandwiches and welds the bonding substrates between the bonding device and the mounting surface, an articulated robot to which the bonding device is attached, and a control unit that controls the articulated robot and the bonding device.

A bonding method according to a seventh aspect of the present disclosure is characterized in that, in the bonding method according to the sixth aspect, the mounting surface is formed so as to include a plurality of bonding supporting surfaces, and the control unit controls the articulated robot and the bonding device such that the bonding substrates are welded on the plurality of bonding supporting surfaces.

A bonding method according to an eighth aspect of the present disclosure is characterized in that, in the bonding method according to the sixth aspect, the bonding system is further provided with a temperature adjustment device that adjusts a temperature of the mounting surface.

A bonding method according a ninth aspect of the present disclosure is characterized in that, in the bonding method according to the sixth aspect, the mounting surface is formed so as to include a plurality of bonding supporting surfaces, and the bonding system is further provided with a temperature adjustment device that adjusts a temperature of the plurality of bonding supporting surfaces.

A bonding method according to a tenth aspect of the present disclosure is characterized in that, in the bonding method according to any of the sixth through ninth aspects, the bonding system is further provided with an operating device that operates the supporting jig.

Advantageous Effects of the Invention

As has been described above, the bonding system and bonding method according to the present disclosure have the excellent effect that they provide superior productivity when articles formed from a thermoplastic resin material are bonded together via welding.

DESCRIPTION OF THE EMBODIMENTS

Hereinafter, a bonding system S and a bonding method according to an exemplary embodiment of the present disclosure will be described with reference to FIG. 1A through FIG. 7.

Figure 2:
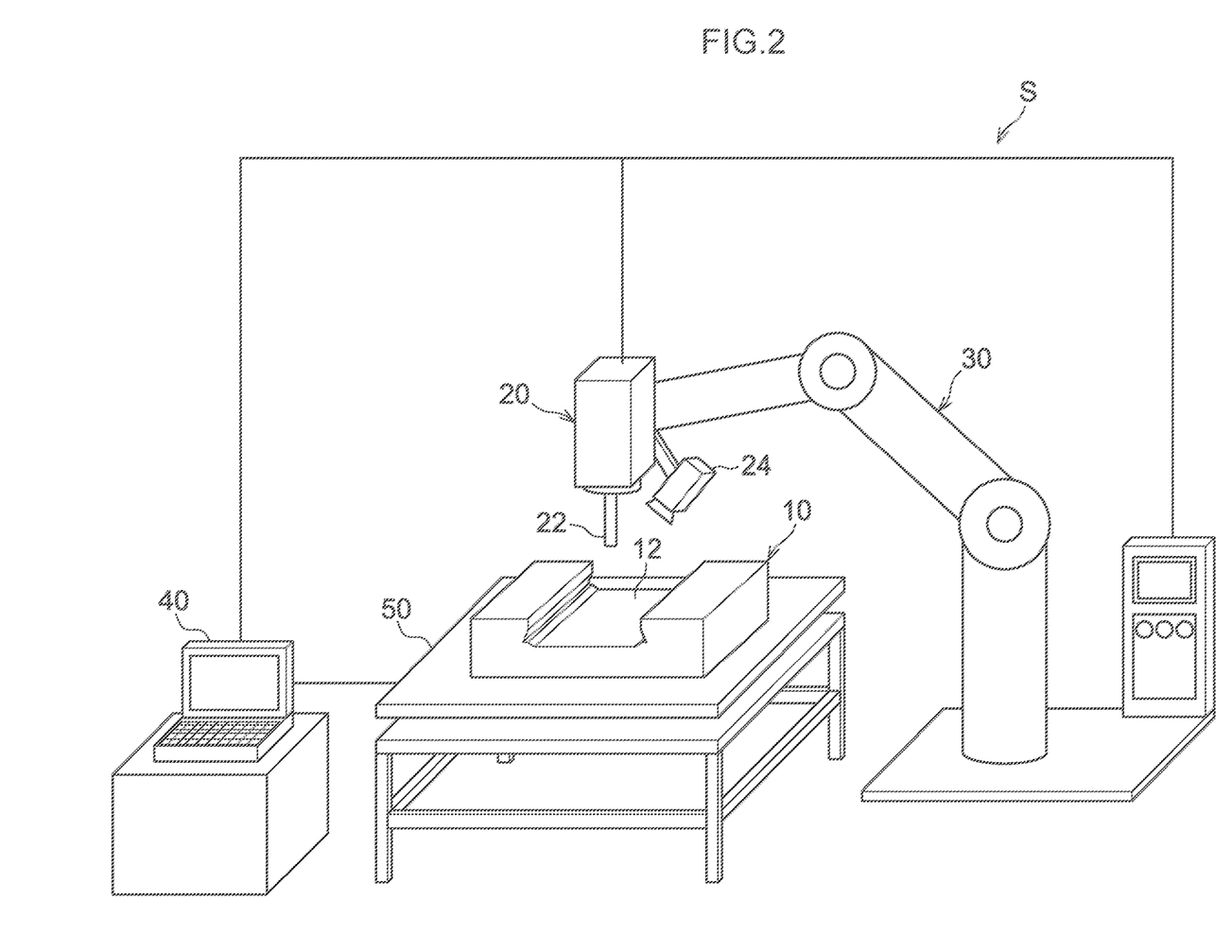
FIG. 2 is a view showing the overall structure of the bonding system of the present exemplary embodiment.

The overall structure of the bonding system S of the present exemplary embodiment is shown in FIG. 2. As is shown in FIG. 2, the bonding system S of the present exemplary embodiment is provided with an articulated robot 30, a bonding device 20, a supporting jig 10, an operating device 50, and a control unit 40.

Note that thermoplastic resin materials are included as the bonding substrates 90 that are to be bonded by the bonding system S. In other words, the bonding that is performed may be, for example, a bonding together of bonding substrates 90 that are each formed from thermoplastic resin materials, or a bonding together of a bonding substrate formed from a thermoplastic resin material and a bonding substrate formed from a metal material. Examples of the resin material include fiber reinforced resins such as carbon fiber reinforced resins and glass fiber reinforced resins, and also resins other than these.

(Articulated Robot 30)

The articulated robot 30 is a vertically articulated robot that is provided with articulated joints. The number of axes of the articulated robot 30 is, for example, from 4 to 7 axes, however, a different number of axes may also be employed. The bonding device 20 is attached to a wrist portion of the articulated robot 30. The articulated robot 30 is constructed so as to be able to bear the weight of the bonding device 20, and to withstand the load generated during bonding.

(Bonding Device 20)

Figure 1A:
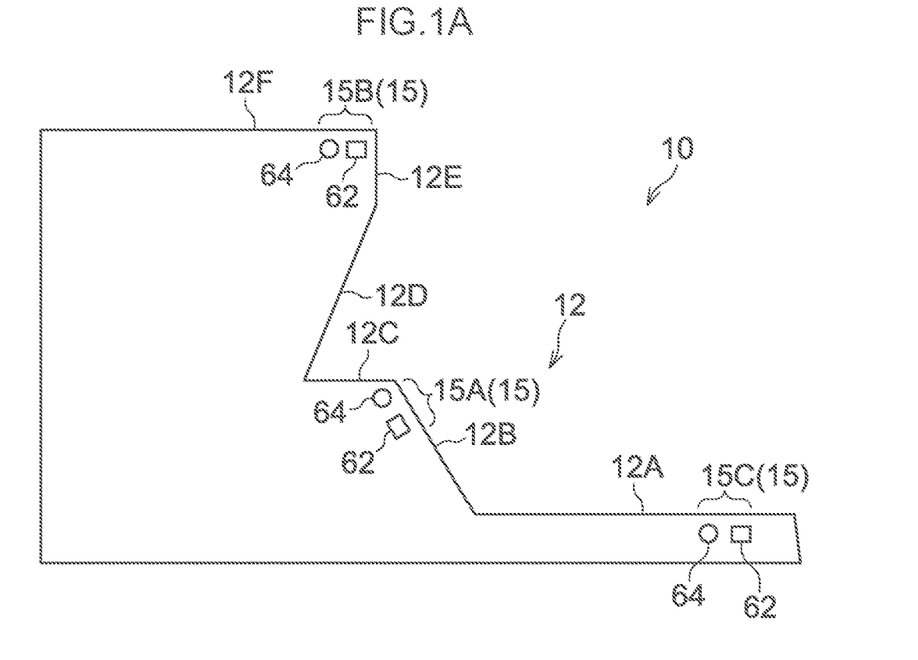
FIG. 1A is an enlarged cross-sectional view showing a supporting jig 10 in a bonding system of the present exemplary embodiment.
Figure 1B:
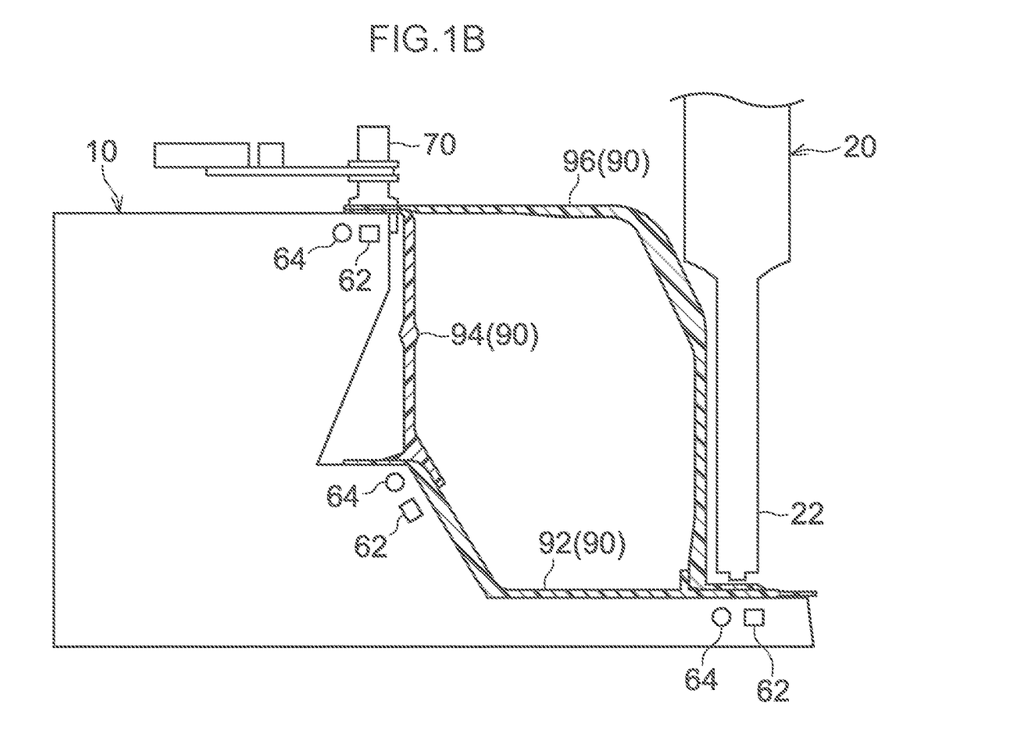
FIG. 1B is an enlarged cross-sectional view showing a state in which bonding substrates are bonded using the bonding system of the present exemplary embodiment.

The bonding device 20 is a device that sandwiches bonding substrates 90 between itself and the supporting jig 10, and bonds the bonding substrates 90 together by welding (see FIG. 1A and FIG. 1B). The bonding method used by the bonding device 20 is desirably a surface direct pressure bonding method which is applied to the bonding substrates 90, and it is desirable that, for example, ultrasonic welding and electromagnetic induction heat welding be performed.

Note that because the direction of excitation when vibration welding is performed is limited to a single direction, this method cannot be used to bond together bonding substrates 90 whose bonding surfaces have a two-dimensional or greater configuration. In addition, there are also a large number of layout restrictions in articles having a unidirectional structure such as in the amplitude portion and in providing part clearance and the like, so that this method is not suitable for these articles as well. Accordingly, the term 'bonding device' of the present disclosure does not include devices that perform vibration welding.

Figure 4:
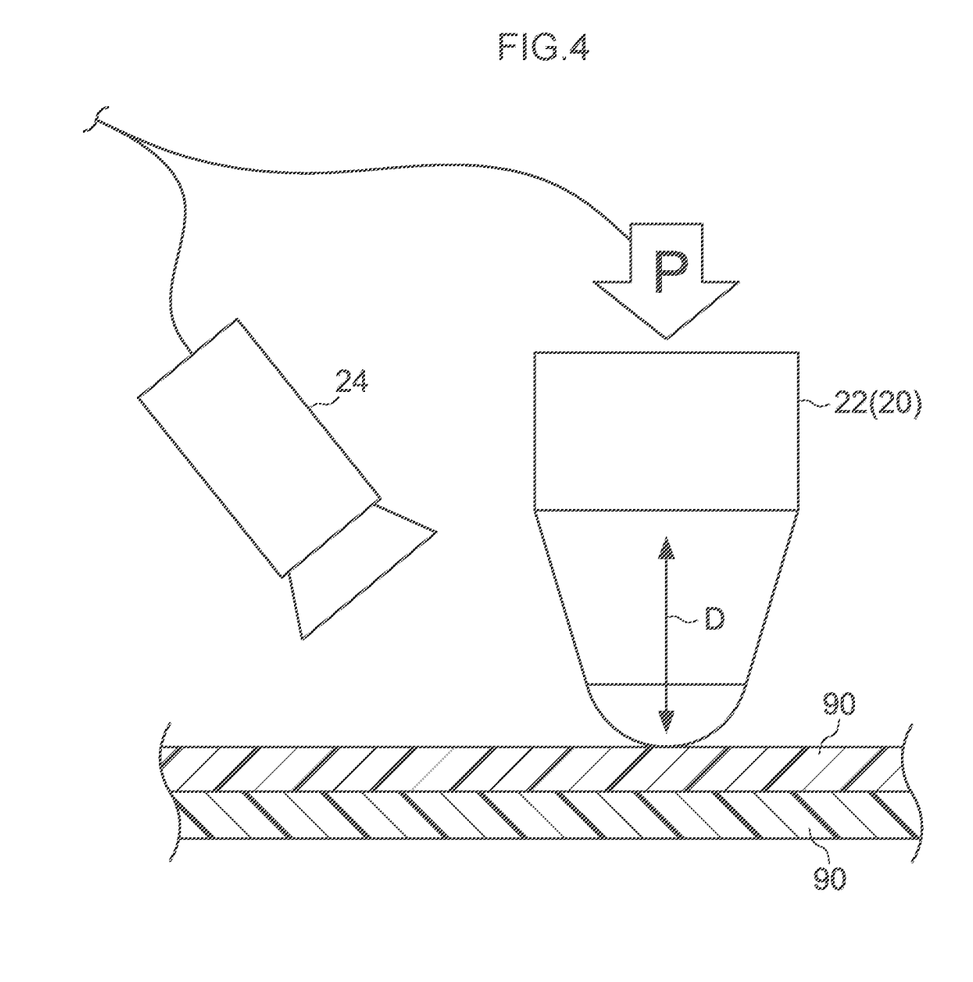
FIG. 4 is an enlarged view showing the bonding device of the present exemplary embodiment.

A structure employed when the bonding method of the bonding device 20 is an ultrasonic welding method is shown in FIG. 4. As is shown in FIG. 4, bonding substrates 90 that are formed from thermoplastic resin are bonded together via fusing by ultrasonic vibration provided by a distal end portion 22 (i.e., a horn) of the bonding device 20 and welding pressure P.

Figure 5:
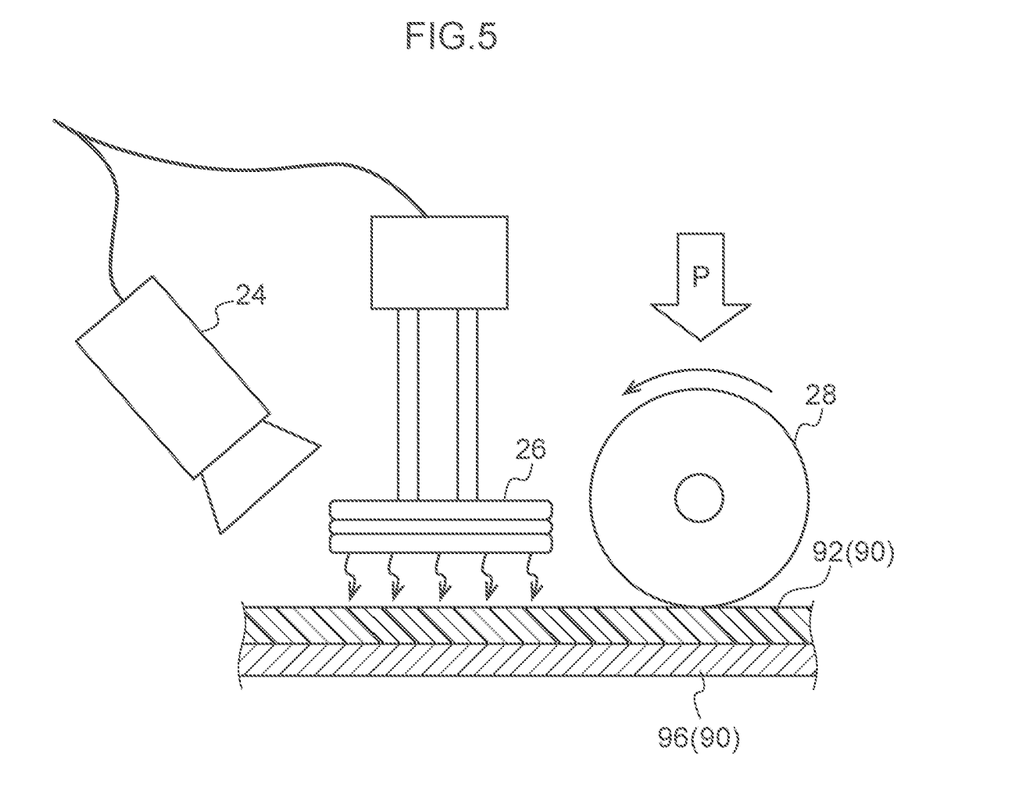
FIG. 5 is an enlarged view showing another aspect of the bonding device of the present exemplary embodiment, namely, a bonding device used in electromagnetic induction heat welding.

In addition, a structure employed when the bonding method of the bonding device 20 is an electromagnetic induction heat welding method is shown in FIG. 5. As is shown in FIG. 5, a bonding substrate 90 that has electrical conductivity (here, for example, a substrate 96 that is formed from a metal material) is heated as a result of an induction current being generated by supplying a high-frequency current to a coil 26, and consequently melts a substrate 92 that is formed from a thermoplastic resin material. The substrate 92 and the substrate 96 are then bonded together by welding pressure P applied by a roller 28. Note that it is also possible for the vertical relationship between the metal material substrate 96 and the resin material substrate 92 to be inverted.

Figure 6:
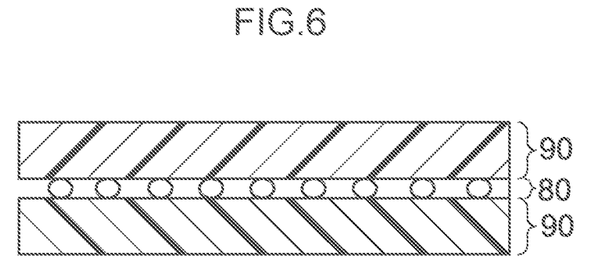
FIG. 6 is a schematic diagram showing a state in which a conductivity imparting component is sandwiched between bonding substrates 90.

When the bonding method of the bonding device 20 is an electromagnetic induction heat welding method and the bonding substrates 90 that are to be bonded together are formed solely by resin materials having no electrical conductivity, then as is shown in FIG. 6, a conductivity imparting component 80 such as a conductive filler or metal mesh or the like is interposed between the bonding substrates 90 thereby enabling these to be bonded together.

(Supporting Jig 10)

The supporting jig 10 is provided with a mounting surface 12 on which the bonding substrates 90 are mounted (i.e., set). As is shown in FIG. 1B, the bonding substrates 90 are mounted on the mounting surface 12, and once the bonding substrates 90 (i.e., 92 and 96) have been sandwiched between the mounting surface 12 and the distal end portion 22 (i.e., the horn) of the bonding device 20, they are bonded together. In this way, the bonding device 20 is able to access the bonding substrates 90 from one side thereof, and consequently bond the bonding substrates 90 together.

As is shown in FIG. 4, a load sensor, a distal end position control device, and a thermal camera 24 are provided in the bonding device 20. The load sensor detects the pressure P that is applied by the distal end portion 22 to the bonding substrates 90. The distal end position control device controls the position (see an arrow D) of the distal end of the device. The thermal camera 24 measures the surface temperature of the bonding substrates 90.

As is shown in FIG. 1A and FIG. 1B, temperature sensors 62 such as thermocouples are built into the supporting jig 10. The temperature sensors 62 detect the temperature of the supporting jig 10. The temperature sensors 62 are respectively provided so as to correspond to portions of the supporting jig 10 where the bonding is performed, namely, in the respective bonding supporting surfaces 15 (15A, 15B, 15C; see FIG. 1A). As a result, the temperatures of each of the bonding supporting surfaces 15 can be detected.

As has been described above, because a structure is employed in which the temperature of each portion can be measured, the bonding device 20 can be controlled such that the bonding substrates 90 are adequately melted together, and such that a high bond quality can be guaranteed.

(Temperature Adjustment Devices 64)

Temperature adjustment devices 64 are also provided in the supporting jig 10. The temperature adjustment devices 64 are devices that adjust the temperature of the supporting jig 10.

Various types of structure may be considered for the temperature adjustment devices 64, however, in the present exemplary embodiment, a circuit is formed within the supporting jig 10 and a medium is made to flow along this circuit. The supporting jig 10 can be heated by supplying a heating medium to the circuit, and the supporting jig 10 can be cooled by supplying a cooling medium to the circuit. Examples of the medium supplied to the circuit include water, oil, and air and the like. Note that the temperature adjustment devices 64 may also be formed by a cartridge heater that is embedded within the supporting jig 10.

As is shown in FIG. 1A and FIG. 1B, a temperature adjustment device 64 is provided so as to correspond to each of the bond supporting surfaces 15 (15A, 15B, 15C), and is formed so as to be able to adjust the respective temperature of each individual bonding supporting surface 15 (15A, 15B, 15C).

(Operating Device 50)

The operating device 50 is a device that operates rotations and the like of the supporting jig 10. The operating device 50 is controlled so as to move in conjunction (i.e., in coordination) with the articulated robot 30. As a result, the reach of the articulated robot 30 is compensated and a reduction in bonding time can be achieved.

Figure 3:
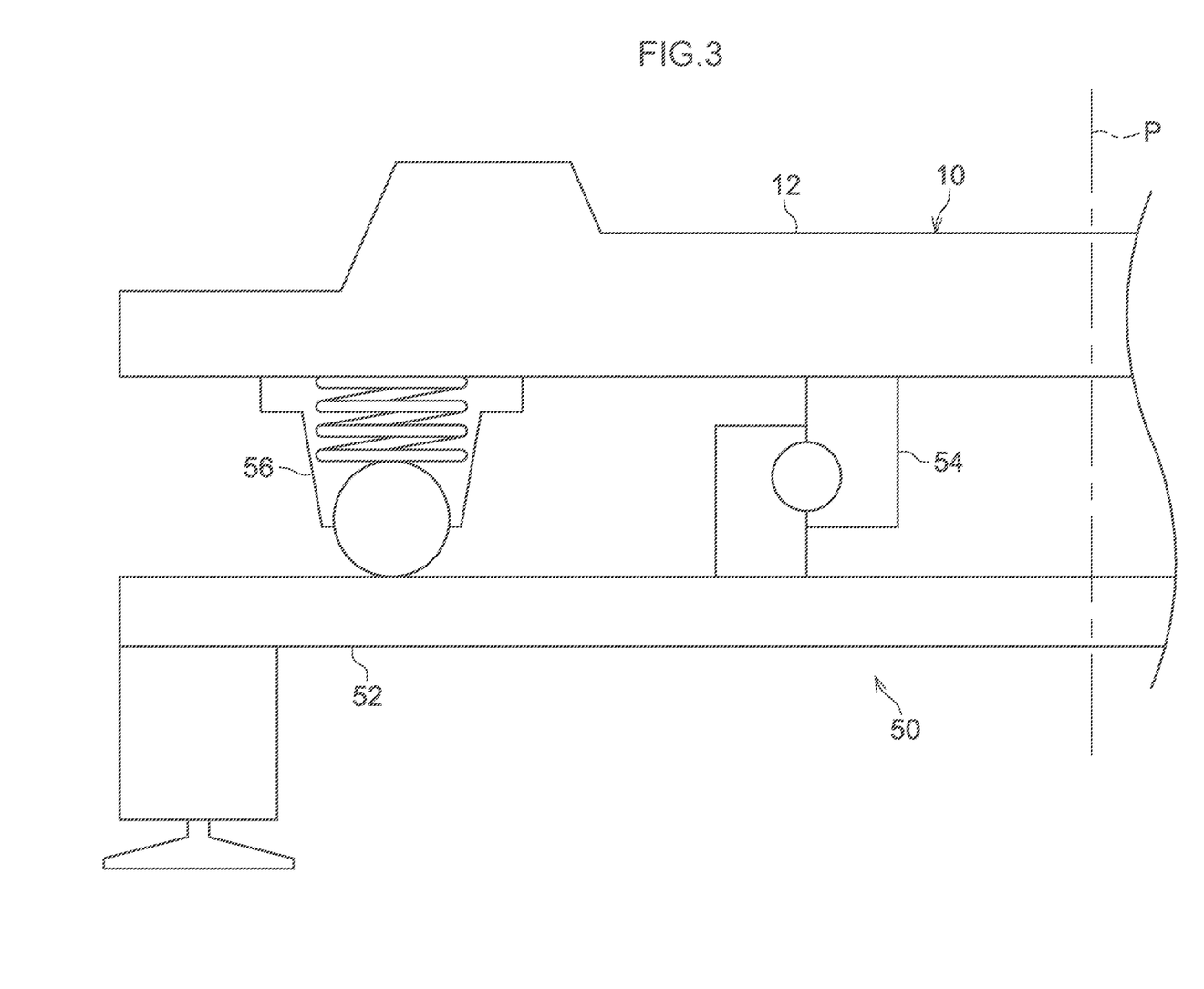
FIG. 3 is a cross-sectional view showing an operating device of the present exemplary embodiment.

In the present exemplary embodiment, as is shown in FIG. 3, a turning bearing 54 is provided between a stand 52 and the supporting jig 10. As a consequence, the supporting jig 10 is able to be rotated around an axis P that extends in an up-down direction. In addition, a spring-loaded ball roller 56 is provided in a portion located at a distance from the axis P forming the center of rotation. As a result, the supporting jig 10 is able to resist moment and deflection during rotation.

(Control Unit 40)

The control unit 40 is connected to the articulated robot 30, the bonding device 20, the operating device 50, and the temperature adjustment device 64, and controls each of the articulated robot 30, bonding device 20, operating device 50, and temperature adjustment device 64.

For example, the control unit 40 controls the bonding device 20 based on the surface temperature of the bonding substrates 90 detected by the thermal camera 24, and on the temperature of the supporting jig 10 detected by the temperature sensors 62. Additionally, the control unit 40 also controls the bonding device 20 based on the pressure P applied to the bonding substrates 90 detected by the load sensor. As a result, the weld quality can be stabilized.

Moreover, for example, the bonding supporting surfaces 15 are heated prior to welding as a result of the control unit 40 controlling the temperature adjustment device 64. As a consequence, the bonding substrates 90 that are in contact with the bonding supporting surface 15 are heated, so that the molten state of the bonding substrates 90 is either accelerated, or the molten state thereof is maintained.

Additionally, the control unit 40 also cools the bonding supporting surface 15 after welding. As a consequence, the bonding substrates 90 that are in contact with the bonding supporting surface 15 are cooled, so that any thermal effects on portions that are adjacent to the portions being bonded are inhibited. Accordingly, the weld quality can be stabilized and improved.

(Specific Structure of the Supporting Jig)

An example of the configuration of the supporting jig 10 is shown in FIG. 1A. As is shown in FIG. 1A, the mounting surface 12 is not formed as a simple flat surface, but is instead formed having a three-dimensional configuration.

More specifically, the mounting surface 12 is formed so as to include a first horizontal surface 12A whose normal direction faces upwards. A first inclined surface 12B is formed extending diagonally upwards from an end portion of the first horizontal surface 12A. A normal direction of the first inclined surface 12B faces diagonally upwards (i.e., in a diagonally upward direction towards the upper-right side in FIG. 1A). A second horizontal surface 12C is formed extending from an upper end of the first inclined surface 12B. A second inclined surface 12D whose normal direction faces diagonally downwards is formed extending from an end portion (i.e., the left end in FIG. 1A) of the second horizontal surface 12C, and a third horizontal surface 12F is formed via a vertical surface 12E extending from an upper end of the second inclined surface 12D.

The bonding steps are performed at each of the first horizontal surface 12A, the first inclined surface 12B, and the third horizontal surface 12F.

More specifically, firstly, the first bonding substrate 92 and the second bonding substrate 94 are welded together at the first inclined surface 12B. The portion on the first inclined surface 12B where bonding is performed is referred to specifically as a first bonding supporting surface 15A (see FIG. 1A).

Next, the first bonding substrate 92 and the third bonding substrate 96 are welded together at the third horizontal surface 12F. The portion on the third horizontal surface 12F where bonding is performed is referred to specifically as a second bonding supporting surface 15B.

Lastly, the first bonding substrate 92 and the third bonding substrate 96 are welded together at the first horizontal surface 12A. The portion on the first horizontal surface 12A where bonding is performed is referred to specifically as a third bonding supporting surface 15C.

In other words, the order in which bonding is performed is, firstly, at the first bonding supporting surface 15A, secondly, at the second bonding supporting surface 15B, and lastly, at the third bonding supporting surface 15C. When the bonding at the first bonding supporting surface 15A is performed, the first bonding substrate 92 and the second bonding substrate 94 are mounted on the supporting jig 10, while the third bonding substrate 96 is left off the supporting jig 10. After the bonding at the first bonding surface 15A has been completed, as is shown in FIG. 1B, the third bonding substrate 96 is then mounted on the supporting jig 10 and the remaining bonding is performed. Note that, if necessary, the bonding can be performed with the bonding substrates 90 fixed in position by means of a clamp 70 or the like (see FIG. 1B).

The cross-sectional structure shown in FIG. 1B extends in a perpendicular direction relative to the paper surface while the shape of this cross-sectional structure is maintained. Consequently, a closed cross-sectional structure extending in a perpendicular direction relative to the paper surface is formed by the first bonding substrate 92, the second bonding substrate 94, and the third bonding substrate 96.

Accordingly, each bonding portion is bonded either continuously or intermittently in the direction in which each bonding portion extends (i.e., in a perpendicular direction relative to the paper surface). If, for example, the bonding method is an ultrasonic welding method, then the distal end portion 22 of the bonding device 20 is abutted against the bonding portions intermittently in the direction in which each bonding portion extends, and bonding is performed.

Figure 7:
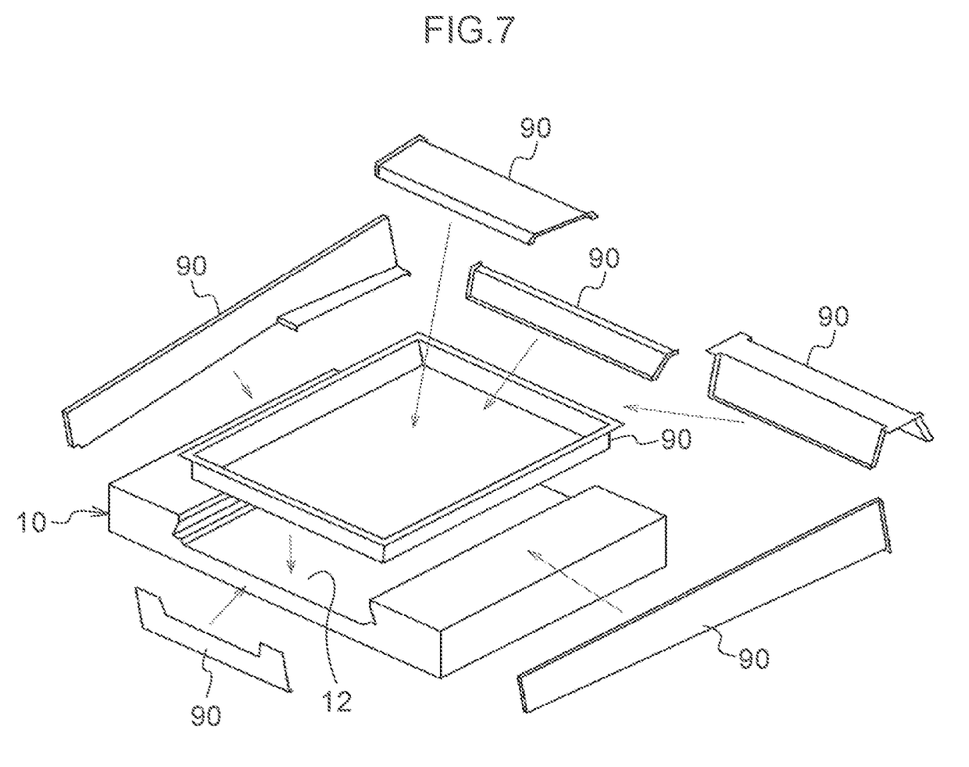
FIG. 7 is a view showing a relationship between a supporting jig and a plurality of bonding substrates.

Note that a procedure for manufacturing a resin frame of an automobile using the bonding system of the present disclosure is shown schematically in FIG. 7. In this manner, according to the bonding system of the present disclosure, it is possible to bond together a plurality of bonding substrates 90 using the single supporting jig 10, and accordingly improve productivity.

[Action and Effects]

Next, actions and effects of the bonding system of the present exemplary embodiment will be described.

In the bonding system S according to the present exemplary embodiment, bonding substrates 90 are mounted on the mounting surface 12 of the supporting jig 10. The bonding device 20 that sandwiches the bonding substrates 90 between itself and the mounting surface 12 and then welds the bonding substrates 90 together is attached to the articulated robot 30. The articulated robot 30 and the bonding device 20 are then controlled by the control unit 40 such that the bonding substrates 90 are welded together.

As a result, the bonding device 20 is able to access the bonding substrates 90 from one side thereof, and bond the bonding substrates 90 together.

Furthermore, compared with a structure in which, for example, a C-gun type of device is attached to an articulated robot and used to perform bonding, an articulated robot having a lighter transportable payload can be used so that capital investment costs can also be reduced. Moreover, because the bonding device of the present exemplary embodiment is more compact than a C-gun type, the operating speed thereof can also be increased.

Moreover, because of this, tool accessibility is improved so that center portions of large-sized components such as 'deep belly portions' like that shown in FIG. 1B can also be easily bonded.

Moreover, in the bonding system S of the present exemplary embodiment, the mounting surface 12 is formed so as to include a plurality of bonding supporting surfaces 15 (15A, 15B, 15) that each have a different normal direction. In addition, the control unit 40 controls the articulated robot 30 and the bonding device 20 such that the bonding substrates 90 are welded at the plurality of bonding supporting surfaces 15 (15A, 15B, 15).

Because of this, using a single supporting jig 10, it is possible to bond together bonding substrates (i.e., resin parts) that require multidirectional bonding. Accordingly, tooling setup changes in the supporting jig 10 can be reduced.

Moreover, the bonding system S of the present exemplary embodiment is also provided with the temperature adjustment device 64 that adjusts the temperature of the bonding supporting surface 15. Because of this, by adjusting the temperature of the bonding supporting surfaces 15 via the temperature adjustment device 64, it is possible to both stabilize and improve the weld quality. In particular, by heating the bonding substrates 90 prior to welding, the resin molten state thereof is either accelerated, or maintained. Moreover, by cooling the welded portion after welding has been completed, any effects from the heat thereof on adjacent portions can be eliminated. Accordingly, a further stabilization and improvement in the weld quality can be anticipated.

Additionally, by providing the temperature adjustment device 64, when a bonding method that is used in combination with a thermosetting adhesive agent is employed, an acceleration of the curing of the adhesive agent is possible, and a shortening in the cycle time can be achieved.

Moreover, in the bonding system S of the present exemplary embodiment, the bonding device 20 is formed such that the distal end portion 22 thereof is replaceable. Because of this, by replacing the distal end portion 22 to match the shape of the bonding portion, limitations on the range of movement and on the singular configuration of the articulated robot 30 can be avoided, and the range of a single bonding operation performed on the supporting jig can be set to a broader range. In addition, tooling setup changes in the supporting jig 10 can be reduced.

Moreover, in the bonding system S of the present exemplary embodiment, the material used to form the supporting jig 10 is an aluminum alloy. Because of this, the supporting jig 10 is highly efficient in discharging heat generated during bonding.

Moreover, in the bonding system S of the present exemplary embodiment, the operating device 50 is also provided in the supporting jig 10. Because of this, limitations on the range of movement of the articulated robot 30 and limitations on the singular configuration of the articulated robot 30 can be avoided, and the range of a single bonding operation performed on the supporting jig can be set to a broader range. In addition, tooling setup changes in the supporting jig 10 can be reduced, and both a reduction in takt time and the bonding of a plurality of articles can be achieved in a single step.

Moreover, in the bonding system S of the present exemplary embodiment, a pressure detection sensor is also mounted in the bonding device 20. Because of this, it is possible to measure the pressure applied to the bonding substrates 90. The bonding device 20 can then be controlled based on the obtained measurement results. Accordingly, not only can the weld quality be stabilized, but better quality control can also be achieved.

Moreover, in the bonding system S of the present exemplary embodiment, a thermal camera is also mounted in the bonding device 20. Because of this, it is possible to measure the surface temperature of the bonding substrates 90. In addition, the temperature sensors 62 are built into the supporting jig 10. As a result, the control unit 40 controls the bonding device 20 based on the obtained measurement results. Accordingly, not only can the weld quality be stabilized, but better quality control can also be achieved.

(Supplementary Description of the Above-Described Exemplary Embodiment)

Note that, in the above-described exemplary embodiment, the bonding system S is provided with the operating device 50, however, the present disclosure is not limited to this, and it is also possible for no operating device to be provided.

Moreover, in the above-described exemplary embodiment, the bonding system S is provided with the temperature adjustment devices 64, however, the present disclosure is not limited to this, and it is also possible for no temperature adjustment devices to be provided.

Moreover, in the above-described exemplary embodiment, an example is described in which the material used to form the supporting jig 10 is an aluminum alloy, however, the present disclosure is not limited to this, and it is also possible for another material to be used to form the supporting jig.

Moreover, in the above-described exemplary embodiment, an example in which the mounting surface 12 of the supporting jig 10 is formed so as to include a plurality of bonding supporting surfaces 15 (15A, 15B, 15C) that each have a different normal direction, however, the 'plurality of bonding supporting surfaces' of the present disclosure are not limited to these. In other words, it is not essential that the plurality of bonding supporting surfaces be bonding supporting surfaces that each have a different normal direction, and may instead be a plurality of bonding supporting surfaces that each have the same normal direction.

Priority is claimed on Japanese Patent Application No. 2017-065548, the disclosure of which is incorporated herein by reference All references, patent applications and technical specifications cited in the present specification are incorporated by reference into the present specification to the same extent as if the individual references, patent applications and technical specifications were specifically and individually recited as being incorporated by reference.

The invention claimed is:

1. A bonding system comprising:
a supporting jig having a mounting surface including a plurality of bonding supporting surfaces on which bonding substrates are mounted, wherein at least two of the bonding supporting surfaces have different normal directions angled relative to each other at 90 degrees or less;
a stand configured to support a portion of the supporting jig;
a turning bearing disposed between the stand and the supporting jig;
a spring-loaded ball roller disposed between the stand and the supporting jig, the spring-loaded ball roller spaced a distance from the turning bearing;
a bonding device that sandwiches and welds the bonding substrates between the bonding device and the mounting surface;
an articulated robot to which the bonding device is attached, the articulated robot configured to move the bonding device;
a temperature adjustment device that adjusts a temperature of the mounting surface; and
a control unit configured to control the articulated robot and the bonding device to move the bonding device to the plurality of bonding supporting surfaces and weld the bonding substrates thereon.

2. The bonding system according to claim 1, wherein the system further comprises temperature sensors to detect a temperature of the supporting jig.

3. The bonding system according to claim 1, further comprising an operating device that operates the supporting jig.

4. The bonding system according to claim 1, wherein the mounting surface of the supporting jig comprises:
a first horizontal surface;
a first inclined surface that extends upwards and obliquely from an end of the first horizontal surface;
a second horizontal surface that extends horizontally from an end of the first inclined surface; and
a second inclined surface that extends upwards and obliquely from an end of the second horizontal surface;
wherein the first inclined surface defines a first normal direction that extends diagonally upwards; and
wherein the second inclined surface defines a second normal direction that extends diagonally downwards.

5. The bonding system according to claim 4, wherein the mounting surface of the supporting jig further comprises:
a first vertical surface that extends vertically from an end of the second inclined surface; and
a third horizontal surface that extends horizontally from an end of the first vertical surface.

6. The bonding system according to claim 1, wherein:
the bonding device comprises an electromagnetic induction heat welding device and utilizes a coil configured to generate an induction current; and
the bonding substrates have an electrical conductivity and are configured to be heated via the induction current.

7. The bonding system according to claim 1, wherein the bonding device includes a distal end portion, and wherein the bonding system further comprises:
a load sensor configured to detect a pressure applied by the distal end portion of the bonding device to the bonding substrates;
a distal end position control device configured to control a position of the distal end portion of the bonding device; and
a thermal camera configured to measure a surface temperature of the bonding substrates.

8. The bonding system according to claim 1, wherein the supporting jig is rotatable via the spring-loaded ball roller and the turning bearing.

9. The bonding system according to claim 1, wherein the control unit further controls the temperature adjustment device, and the plurality of bonding supporting surfaces are configured to be heated prior to welding via the temperature adjustment device.

10. The bonding system according to claim 1, wherein the bonding device does not use ultrasonic welding.

11. The bonding system according to claim 1, wherein the bonding device uses electromagnetic induction heat welding.

12. A bonding method comprising:
welding bonding substrates, which include a thermoplastic resin material, using a bonding system, the bonding system comprising:
a supporting jig having a mounting surface including a plurality of bonding supporting surfaces on which the bonding substrates are mounted, wherein at least two of the bonding supporting surfaces have different normal directions angled relative to each other at 90 degrees or less;
a stand configured to support a portion of the supporting jig;
a turning bearing disposed between the stand and the supporting jig;
a spring-loaded ball roller disposed between the stand and the supporting jig, the spring-loaded ball roller spaced a distance from the turning bearing;

a bonding device that sandwiches and welds the bonding substrates between the bonding device and the mounting surface;

an articulated robot to which the bonding device is attached, the articulated robot configured to move the bonding device;

a temperature adjustment device that adjusts a temperature of the mounting surface; and a control unit configured to control the articulated robot and the bonding device to move the bonding device to the plurality of bonding supporting surfaces and weld the bonding substrates thereon.

13. The bonding method according to claim 12, wherein the bonding system further comprises temperature sensors to detect a temperature of the supporting jig.

14. The bonding method according to claim 12, wherein the bonding system further comprises an operating device that operates the supporting jig.

* * * * *